US010831157B2

(12) United States Patent
Christmas

(10) Patent No.: US 10,831,157 B2
(45) Date of Patent: Nov. 10, 2020

(54) LIGHTING SYSTEM

(71) Applicant: Envisics Ltd, Milton Keynes (GB)

(72) Inventor: Jamieson Christmas, Milton Keynes (GB)

(73) Assignee: Envisics Ltd, Knowlhill (GB)

( * ) Notice: Subject to any disclaimer, the term of this patent is extended or adjusted under 35 U.S.C. 154(b) by 86 days.

(21) Appl. No.: 16/256,485

(22) Filed: Jan. 24, 2019

(65) Prior Publication Data

US 2019/0354069 A1 Nov. 21, 2019

(30) Foreign Application Priority Data

May 16, 2018 (GB) .................................. 1807959.0

(51) Int. Cl.
*G03H 1/22* (2006.01)
(52) U.S. Cl.
CPC ......... *G03H 1/2294* (2013.01); *G03H 1/2202* (2013.01)
(58) Field of Classification Search
CPC .. G03H 1/2294; G03H 1/2202; G03H 1/2286; G03H 1/14; G03H 2226/04; G03H 2222/16; G03H 2222/33; G03H 2223/16; G03H 1/2205; G03H 1/2249; G03H 1/0005; G03H 1/00; G03H 1/12; G03B 21/145; B60Q 1/0011; B60Q 3/74; B60Q 3/66; B60Q 3/20; B60Q 3/60; B60Q 3/00; G02B 5/32
See application file for complete search history.

(56) References Cited

U.S. PATENT DOCUMENTS

| 3,560,921 | A | 2/1971 | Lopez |
| 5,582,474 | A | 12/1996 | Van Order et al. |
| 7,136,207 | B2 | 11/2006 | Bruegl et al. |
| 2008/0192312 | A1 | 8/2008 | Hendricks et al. |
| 2010/0118117 | A1 | 5/2010 | Kroll |
| 2015/0286187 | A1 | 10/2015 | Collings |
| 2016/0274539 | A1 | 9/2016 | Smithwick |

FOREIGN PATENT DOCUMENTS

| GB | 2211646 | 7/1989 |
| GB | 2542455 | 3/2017 |
| JP | H0241948 A | 2/1990 |

OTHER PUBLICATIONS

Great Britain Search Report dated Oct. 24, 2018 for Great Britain Application No. 1807959.0 filed May 16, 2018, 5 pages.
European Search Report, European Patent Application No. 19152706, dated Mar. 20, 2019.

*Primary Examiner* — Wen Huang
(74) *Attorney, Agent, or Firm* — McDonnell Boehnen Hulbert & Berghoff LLP

(57) ABSTRACT

There is provided a lighting system for a vehicle. The lighting system comprises a holographic projector and a light distribution system. The holographic projector comprises a hologram engine and a spatial light modulator. The hologram engine is arranged to output holograms. The spatial light modulator is arranged to display each hologram and spatially-modulate light in accordance with each hologram. The spatially-modulated light forms a holographic reconstruction, corresponding to each hologram, on a replay plane. The light distribution system comprises a plurality of optical fibres. Each optical fibre comprises an input optically-coupled to respective sub-area of the replay plane and an output optically coupled with an illumination sub-system of the vehicle.

23 Claims, 8 Drawing Sheets

LIGHTING SYSTEM

CROSS-REFERENCE TO RELATED APPLICATIONS

This application claims the benefit of priority of United Kingdom Patent Application no. GB1807959.0, filed May 16, 2018, which is hereby incorporated herein by reference in its entirety.

FIELD

The present disclosure relates to a lighting system. More specifically, the present disclosure relates to a lighting system for a vehicle such as an automotive vehicle. The present disclosure also relates to a central light source for the illumination sub-systems of a vehicle such as the internal illumination sub-systems of the vehicle. The present disclosure further relates to a method of providing, distributing or directing light to illumination sub-systems of a vehicle. The present disclosure also relates to an optical communications system for a vehicle. More specifically, the present disclosure also relates to a Li-Fi system for a vehicle.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram, "CGH", may be calculated by a technique based on a mathematical transformation such as a Fresnel or Fourier transform. These types of holograms may be referred to as Fresnel or Fourier holograms. A Fourier hologram may be considered a Fourier domain representation of the object or a frequency domain representation of the object. A CGH may also be calculated by coherent ray tracing or a point cloud technique, for example.

A CGH may be encoded on a spatial light modulator, "SLM", arranged to modulate the amplitude and/or phase of incident light. Light modulation may be achieved using electrically-addressable liquid crystals, optically-addressable liquid crystals or micro-mirrors, for example.

The SLM may comprise a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The SLM may be reflective meaning that modulated light is output from the SLM in reflection. The SLM may equally be transmissive meaning that modulated light is output from the SLM is transmission.

A holographic projector for imaging may be provided using the described technology. Such projectors have found application in head-up displays, "HUD", and head-mounted displays, "HMD", including near-eye devices, for example.

There is disclosed herein a new application for a holographic projector.

SUMMARY

Aspects of the present disclosure are defined in the appended independent claims.

There is provided a lighting system for a vehicle. The lighting system comprises a holographic projector and a light distribution system. The holographic projector comprises a hologram engine and a spatial light modulator. The hologram engine is arranged to output holograms. The spatial light modulator is arranged to display each hologram and spatially-modulate light in accordance with each hologram. The spatially-modulated light forms a holographic reconstruction, corresponding to each hologram, on a replay plane. The light distribution system comprises a plurality of optical fibres. Each optical fibre comprises an input optically-coupled to respective sub-area of the replay plane and an output optically-coupled to an illumination sub-system of the vehicle.

A central lighting system for a vehicle is provided. Each illumination sub-system of the vehicle does not therefore require its own local light source. A single light source is provided in the vehicle, rather than a plurality of light sources, making for easier maintenance and central control including synchronisation of vehicle sub-systems. The lighting system may be readily coupled with other existing automotive systems. The output of each optical fibre is optically-coupled with an input of an illumination sub-system of the vehicle such that the light distribution system controls which optical fibre or fibres transmit light and therefore which illumination sub-system or sub-systems can themselves emit light, for example, into the vehicle. If an illumination sub-system does not receive source light from the lighting system, it cannot itself emit light. That is, it cannot be switched "on". The holographic projector described herein is well-suited to this application because a software-controlled hologram is used to determine the sub-areas of the holographic replay field which receive light and, optionally or alternatively, a software-controlled grating function may be combined with the hologram to control the position of the holographic replay field within the replay plane. There is therefore provided considerable control over the light field formed at a replay plane which makes for a good system for centrally distributing light within a vehicle using an array of optical fibres. The system is particularly flexible and scalable.

The holographic reconstruction may illuminate at least one sub-area of the replay plane optically-coupled to an optical fibre of the plurality of optical fibres. Sub-areas of the replay plane are assigned to illumination sub-systems of the vehicle. Any number of sub-areas may be used. There may be a one-to-one correlation between sub-areas and illumination sub-systems or there may be a one-to-many correlation or there may be a mixture of one-to-one and one-to-many correlations. Each optical fibre is arranged to receive light from a corresponding sub-area. The system takes advantage of the high level of control of the light field provided by the holographic projector to use the holographic replay plane as a physical area for selectively distributing light to optical fibres.

The hologram engine may be arranged to output a first hologram at a first time and a second hologram at a second time not equal to the first time. The first hologram forms a first holographic reconstruction which illuminates a first sub-area of the replay plane optically-coupled to a first optical fibre of the plurality of optical fibres. The second hologram forms a second holographic reconstruction which illuminates a second sub-area of the replay plane optically-coupled to a second optical fibre of the plurality of optical fibres. The system takes advantage of the real-time reconfigurability of the spatial light modulator to dynamically allocate light between a plurality of spatially-separated optical fibres.

The first hologram and second hologram may be such that the brightness of the light illuminating the first sub-area is not equal to the brightness of the light illuminating the second sub-area. The brightness of each illumination sub-system may be individually tuned in software to provide a further improved lighting system.

The first hologram and second hologram may be such that the colour of the light illuminating the first sub-area is not equal to the colour of the light illuminating the second sub-area. The colour of the light distributed to each illumination sub-system is individually-tunable to provide a yet further improved lighting system.

The hologram engine may be further arranged to combine each hologram with a grating function corresponding to an optical grating having a grating period. Accordingly, the position of the replay field on the replay plane is controlled in software by the grating period thereby providing a further degree of freedom for the distribution of light on the replay plane.

The grating period may determine the sub-area or sub-areas of the replay plane illuminated by the holographic reconstruction. The grating period may be dynamically-controlled to selectively illuminate sub-areas of the replay plane which are coupled to optical fibres. Accordingly, further flexibility is provided to the lighting system.

The hologram engine may comprise a look-up table of grating functions. Each grating function corresponds to at least one illumination sub-system of the vehicle. A simple system is therefore provided for determining which illumination sub-system or sub-systems receive light.

Each optical fibre may be a multimode optical fibre. The light field formed on the replay plane is formed by holography and therefore requires light having a minimum coherence length. However, each optical fibre does not need to be limited to a single propagation mode. A multimode fibre may be preferable because the different permitted propagation modes will act to provide a more uniform light distribution to the illumination sub-systems.

The illumination sub-system may be: an internal door handle light; an external door handle light; an electric window switch; a vanity mirror light; a reading light; a foot-well light; a welcome mat light; a door sill light or a wing mirror light.

The hologram may be a Fourier transform hologram or a Fresnel transform hologram. Accordingly, software control over the distance from the spatial light modulator to the replay plane is provided.

The holographic projector may further comprise a light-receiving surface, at the replay plane, arranged to receive the holographic reconstruction. The light-receiving surface may be moveable to reduce the perception of laser speckle and improve the uniformity of the illumination patterns formed at the replay plane.

The spatial light modulator may be a phase modulator and the hologram may comprise an array of phase-delay values. Accordingly, the image formation process is highly energy efficient.

The hologram engine may be arranged to receive image data and calculate the hologram is real-time from the image data. The hologram engine may be arranged to receive a control signal and determine the hologram, from a plurality of holograms stored in memory, in response to the control signal.

The lighting system may be further used as a wireless communication system such as cellular wireless networking including Li-Fi. The light distribution system may be used to distribute cellular data. Each illumination sub-system of the vehicle may be used distribute the same data or different data or any combination thereof. A selected sub-set of the illumination sub-systems of the vehicle may be used to distribute or communication or transmit cellular data.

That is, the light distribution system may additionally or alternatively form a Li-Fi system (or network) in which at least one illumination sub-system of the vehicle is a Li-Fi antenna (or transmitter) of the Li-Fi system. The spatially-modulated light may be modulated or encoded with telecommunications (or cellular) data. A first illumination sub-system of the vehicle is used to transmit first telecommunications data and a second illumination sub-system of the vehicle is used to transmit second telecommunications data, optionally, wherein the first telecommunications data is different to the second telecommunications data.

There is also provided a vehicle comprising the lighting system.

There is also provided a method of providing light to illumination sub-systems of a vehicle. The method comprises providing a hologram to a spatial light modulator, displaying the hologram on the spatial light modulator and spatially modulating light in accordance with the hologram to form a holographic reconstruction, corresponding to the hologram, on a replay plane. The method further comprises providing light of the holographic reconstruction to an illumination sub-system of the vehicle using an optical fibre having an input optically-coupled to a sub-area of the replay plane illuminated by the holographic reconstruction and an output optically-coupled to the illumination sub-system.

The method may further comprise providing a second hologram to the spatial light modulator, displaying the second hologram on the spatial light modulator and spatially modulating light in accordance with the second hologram to form a second holographic reconstruction, corresponding to the second hologram, on a replay plane. The method may further comprise providing light of the second holographic reconstruction to a second illumination sub-system of the vehicle using a second optical fibre having an input optically-coupled to a second sub-area of the replay plane illuminated by the second holographic reconstruction and an output optically-coupled to the second illumination sub-system.

The term "hologram" is used to refer to the recording which contains amplitude information or phase information, or some combination thereof, about the object. The term "holographic reconstruction" is used to refer to the optical reconstruction of the object which is formed by illuminating the hologram. The term "replay plane" is used herein to refer to the plane in space where the holographic reconstruction is fully formed. The term "replay field" is used herein to refer to the sub-area of the replay plane which can receive spatially-modulated light from the spatial light modulator. The terms "image", "replay image" and "image region" refer to areas of the replay field illuminated by light forming the holographic reconstruction. In embodiments, the "image" may comprise discrete spots which may be referred to as "image pixels".

The terms "encoding", "writing" or "addressing" are used to describe the process of providing the plurality of pixels of the SLM with a respect plurality of control values which respectively determine the modulation level of each pixel. It may be said that the pixels of the SLM are configured to "display" a light modulation distribution in response to receiving the plurality of control values. Thus, the SLM may be said to "display" a hologram.

It has been found that a holographic reconstruction of acceptable quality can be formed from a "hologram" containing only phase information related to the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will change the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
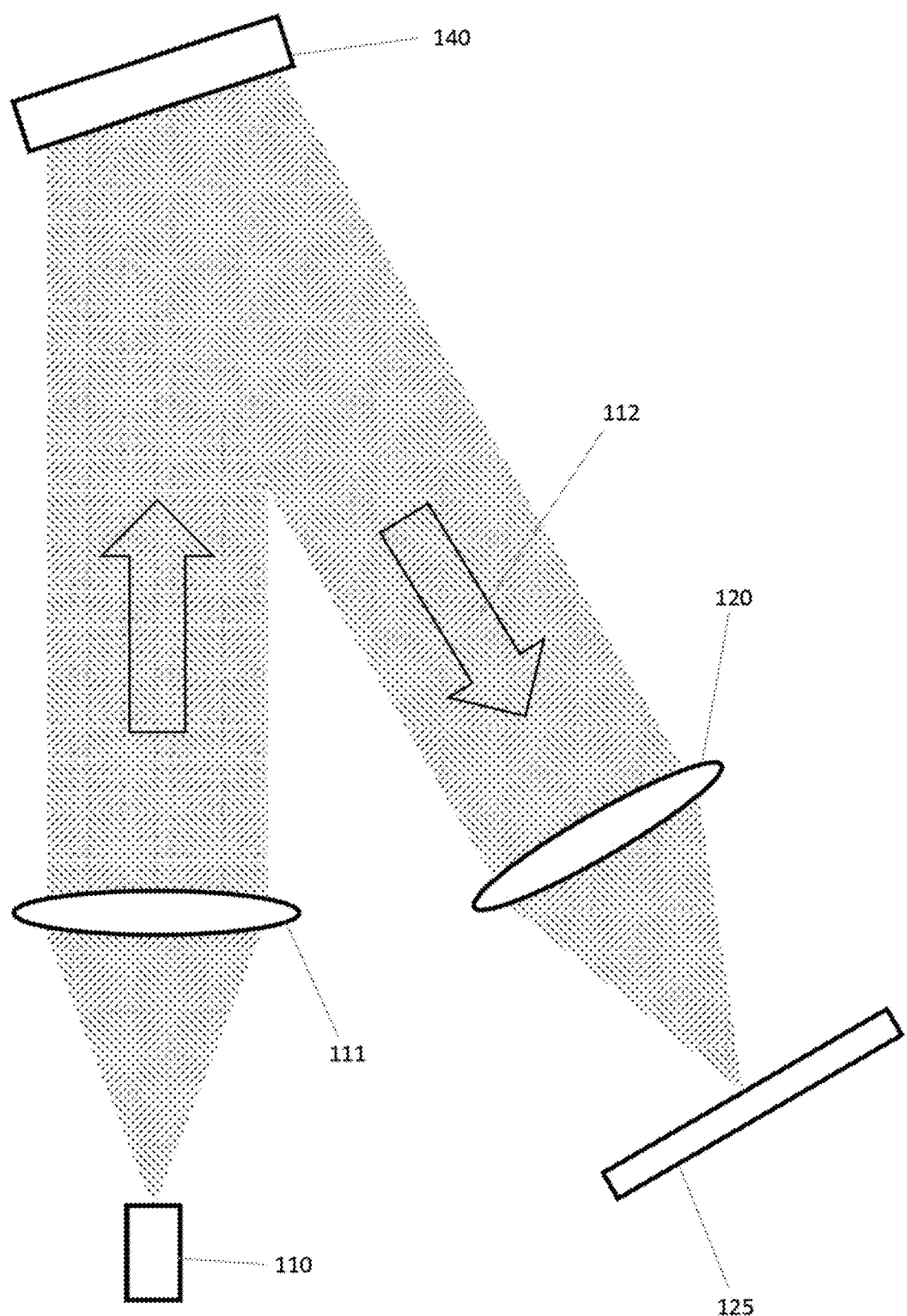
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG.

1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\psi_A(x, y)$ and $\psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\psi$ [u, v] of the Fourier transform of the data set which gives rise to a known amplitude information T[x, y], wherein the amplitude information T[x, y] is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\psi$[u, v] is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
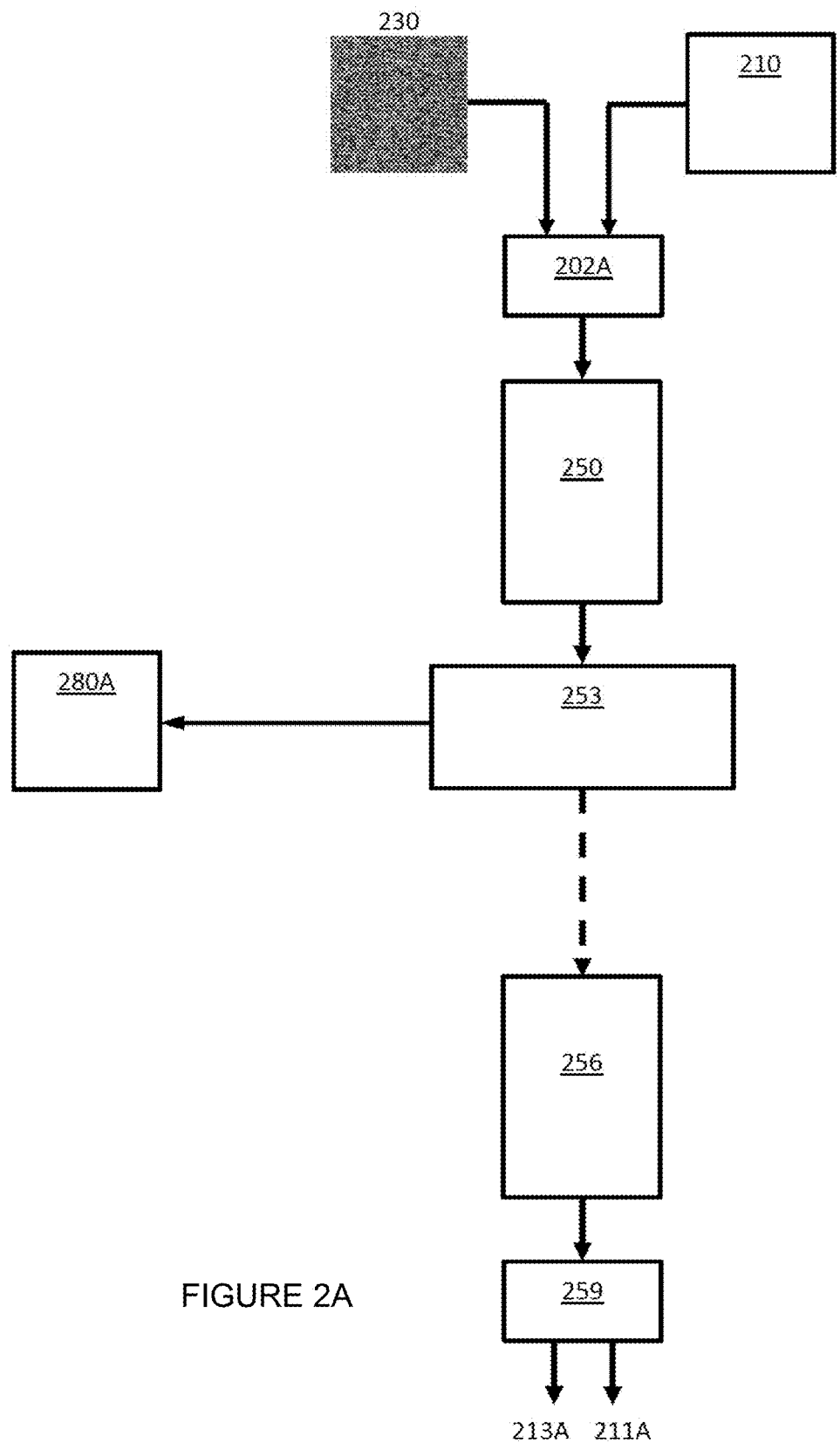
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may performed. However, this comparison step is not essential and in other embodiments, the number of iterations of the algorithm performed is predetermined or preset or user-defined.

Figure 2B:
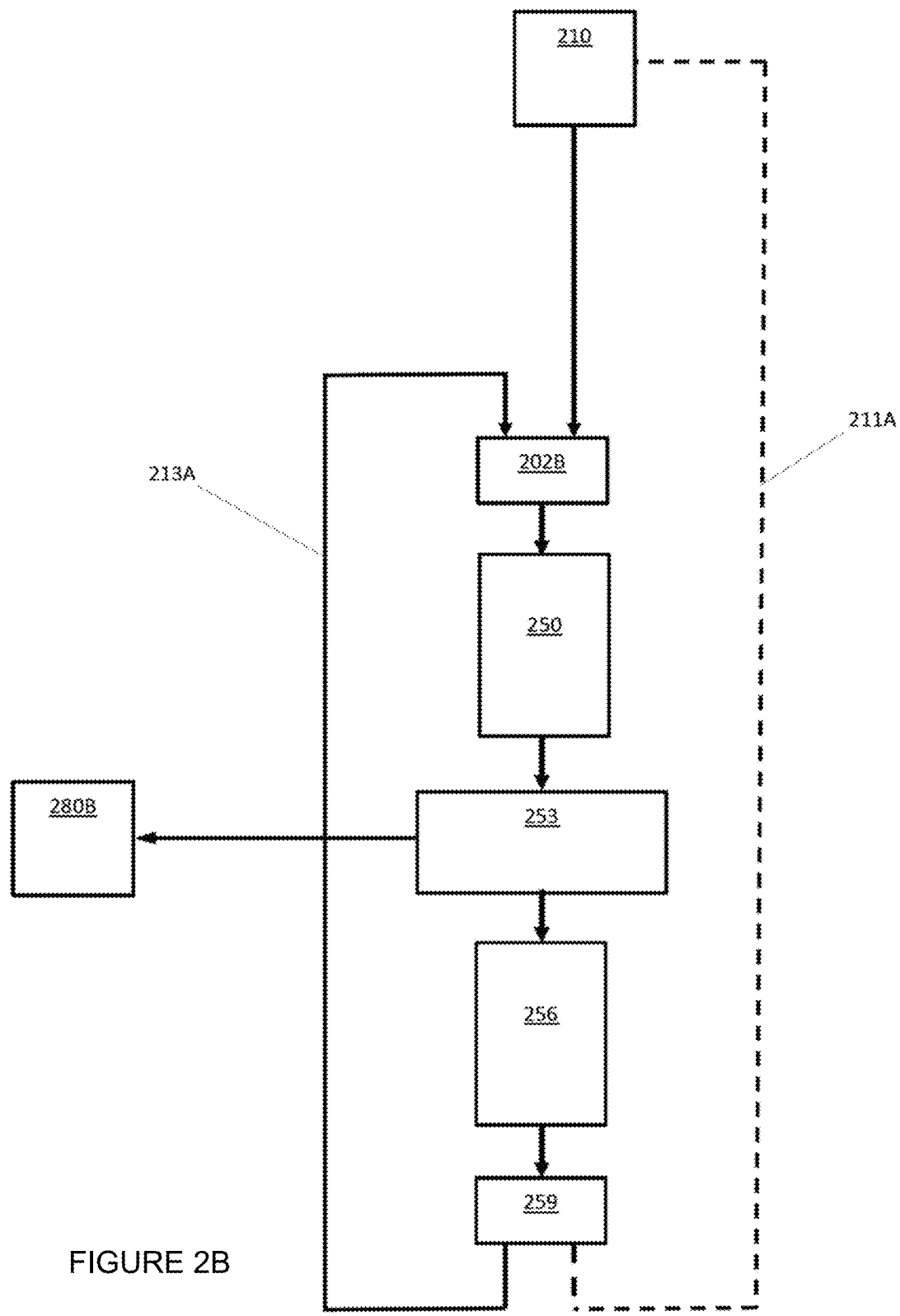
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
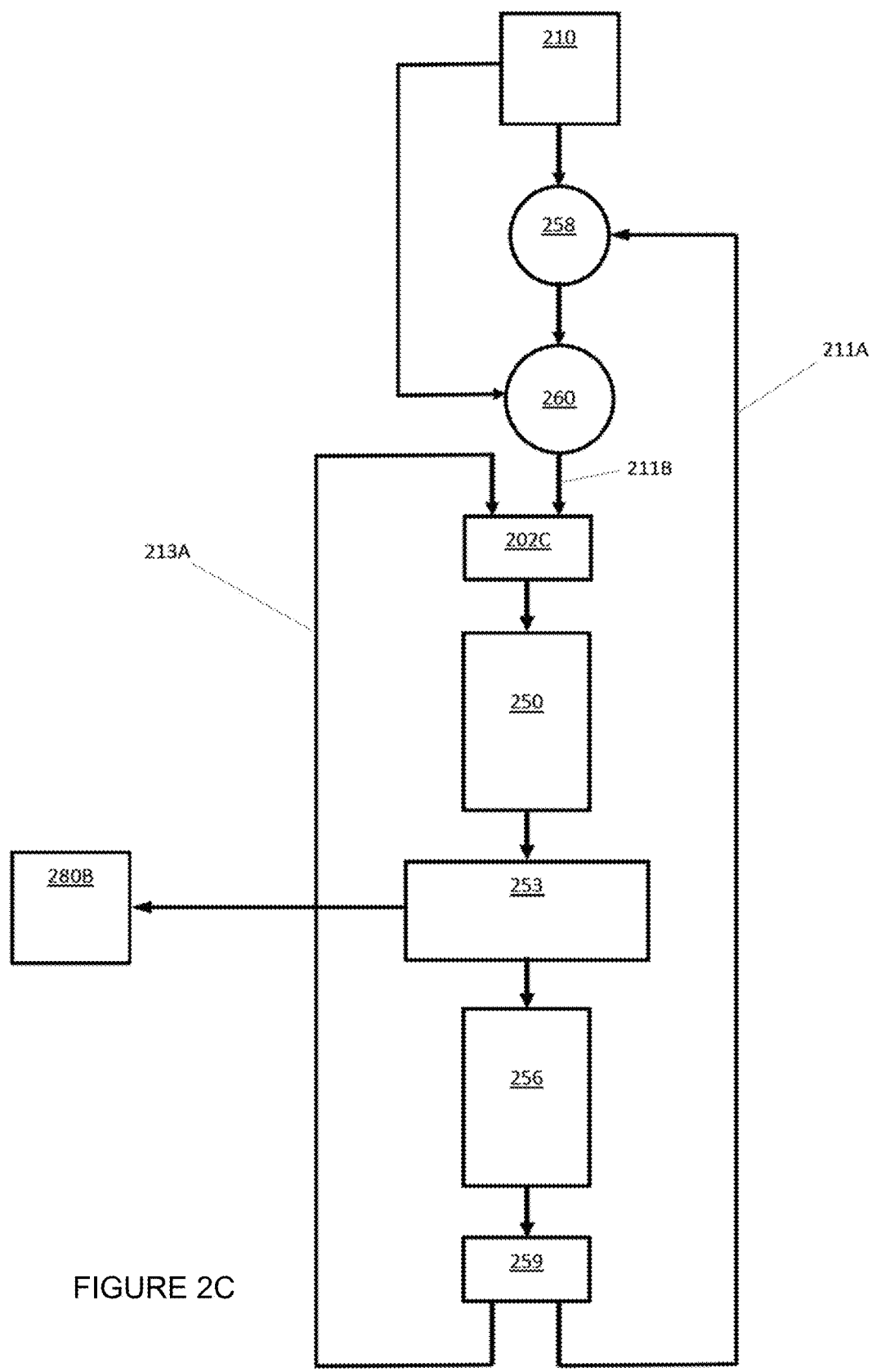
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x,y] = F'\{\exp(i\psi_n[u,v])\}$$

$$\psi_n[u,v] = \angle F\{\eta \cdot \exp(i\angle R_n[x,y])\}$$

$$\eta = T[x,y] - \alpha(R_n[x,y] - T[x,y])$$

where:
F' is the inverse Fourier transform;
F is the forward Fourier transform;
R[x, y] is the complex data set output by the third processing block 256;
T[x, y] is the input or target image;
∠ is the phase component;
ψ is the phase-only hologram 280B;
η is the new distribution of magnitude values 211B; and
α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram ψ(u, v) comprises a phase distribution in the frequency or Fourier domain.

In some embodiments, the Fourier transform is performed computationally by including lensing data in the holographic data. That is, the hologram includes data representative of a lens as well as data representing the object. In these embodiments, the physical Fourier transform lens 120 of FIG. 1 is omitted. It is known in the field of computer-generated hologram how to calculate holographic data representative of a lens. The holographic data representative of a lens may be referred to as a software lens. For example, a phase-only holographic lens may be formed by calculating the phase delay caused by each point of the lens owing to its refractive index and spatially-variant optical path length. For example, the optical path length at the centre of a convex lens is greater than the optical path length at the edges of the lens. An amplitude-only holographic lens may be formed by a Fresnel zone plate. It is also known in the art of computer-generated hologram how to combine holographic data representative of a lens with holographic data representative of the object so that a Fourier transform can be performed without the need for a physical Fourier lens. In some embodiments, lensing data is combined with the holographic data by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may include grating data—that is, data arranged to perform the function of a grating such as beam steering. Again, it is known in the field of computer-generated holography how to calculate such holographic data and combine it with holographic data representative of the object. For example, a phase-only holographic grating may be formed by modelling the phase delay caused by each point on the surface of a blazed grating. An amplitude-only holographic grating may be simply superimposed on an amplitude-only hologram representative of an object to provide angular steering of an amplitude-only hologram.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and holograms calculated by other techniques such as those based on point cloud methods.

Light Modulation

A spatial light modulator may be used to display the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimeters in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
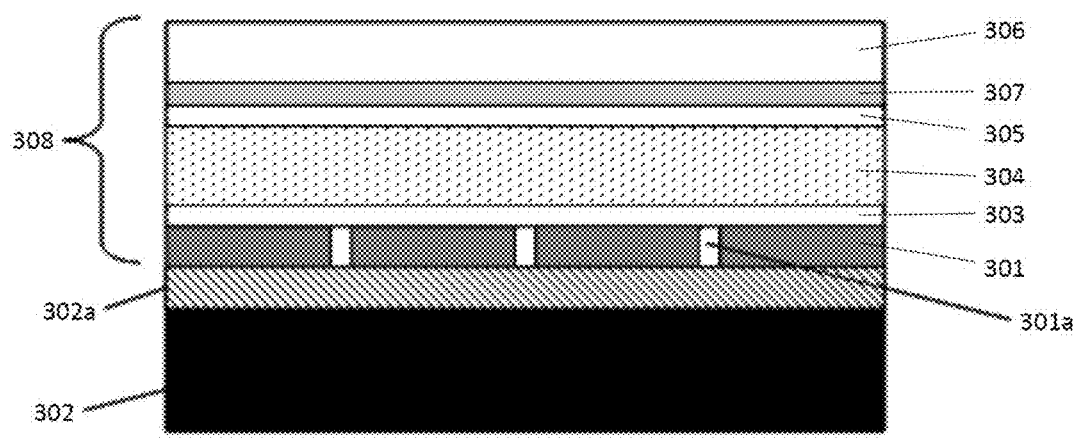
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301*a*, arranged on the upper surface of the substrate. Each of the electrodes 301 can be addressed via circuitry 302*a* buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301*a*. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Lighting System

Figure 4:
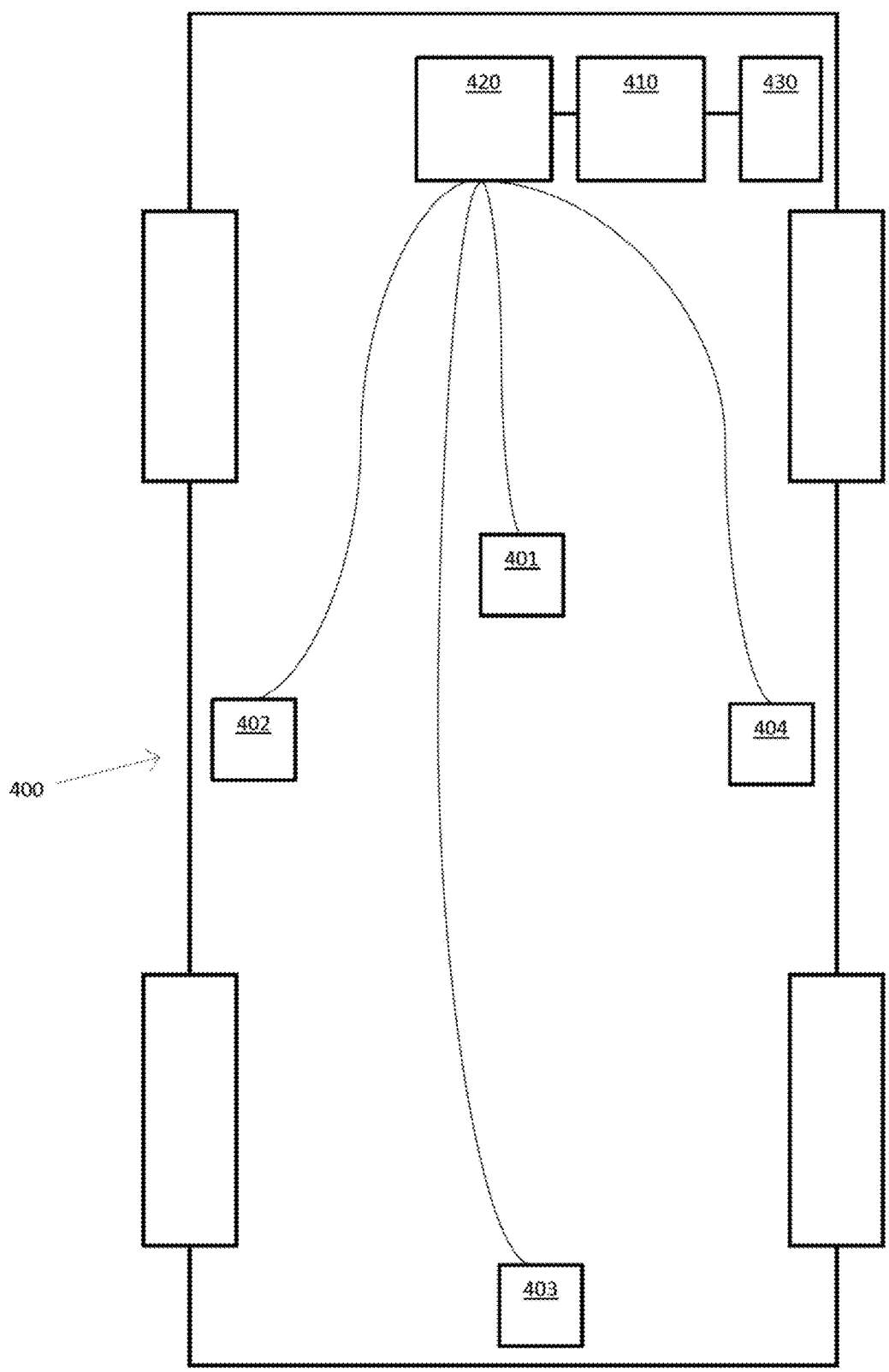
FIG. 4 shows a vehicle incorporating a lighting system in accordance with some embodiments.

FIG. 4 shows a vehicle 400 comprising a lighting system in accordance with some embodiments of the present disclosure. The lighting system comprises a holographic projector 410, a light distribution system 420 and control system 430.

The light distribution system 420 is connected to a plurality of illumination sub-systems including first illumination sub-system 401, second illumination sub-system 402, third illumination sub-system 403 and fourth illumination sub-system 404. Four illumination sub-systems are shown by way of example only; the vehicle may comprise any number of illumination sub-systems. The light distribution system 420 comprises a plurality of light guides, such as optical fibres, wherein each light guide is connected to a respective illumination sub-system of the vehicle. The light distribution system is responsible for delivering the source light to each illumination sub-system as required.

Each illumination sub-system provides illumination of a certain component or area of the vehicle or area of space inside or outside the vehicle. Examples of a vehicle illumination sub-system are: an internal door handle light; an external door handle light; an electric window switch; a vanity mirror light; a reading light; a foot-well light; a welcome mat light and a wing mirror light. Each Illumination sub-system may be provided inside and/or outside the vehicle. Each illumination sub-system may provide illumination inside and/or outside the vehicle. Each illumination sub-system may include any number of additional optics, such as colour filters to provide illumination of a particular colour, which process the received light source. The vehicle therefore has a central light source for all the illumination sub-systems. Accordingly, each illumination sub-system does not need to have its own light source. The light distribution system 420 is arranged to selectively distribution light to the illumination sub-systems as described in the following. In some embodiments, if an illumination sub-system receives light from the light distribution system, the illumination sub-system will emit light. Therefore, in these embodiments, the light distribution system determines which illumination sub-systems are "on". The skilled person will understand that, optionally, an additional optical switch may be provided within an illumination sub-system to further control when the illumination sub-system emits light.

The holographic projector takes the general form shown in FIG. 1 and comprises a hologram engine, a spatial light modulator and a light source. As described herein, a holographic reconstruction is projected onto a replay field. A light-receiving surface, such as a diffuser or screen, may be position at the replay field such that the holographic reconstruction is formed thereon. The holographic reconstruction is a light pattern within the replay field and, as will be understood from the prior description, the light pattern may be changed by changing the hologram. The hologram, and therefore the light pattern, may be changed in real-time.

Figure 5A:
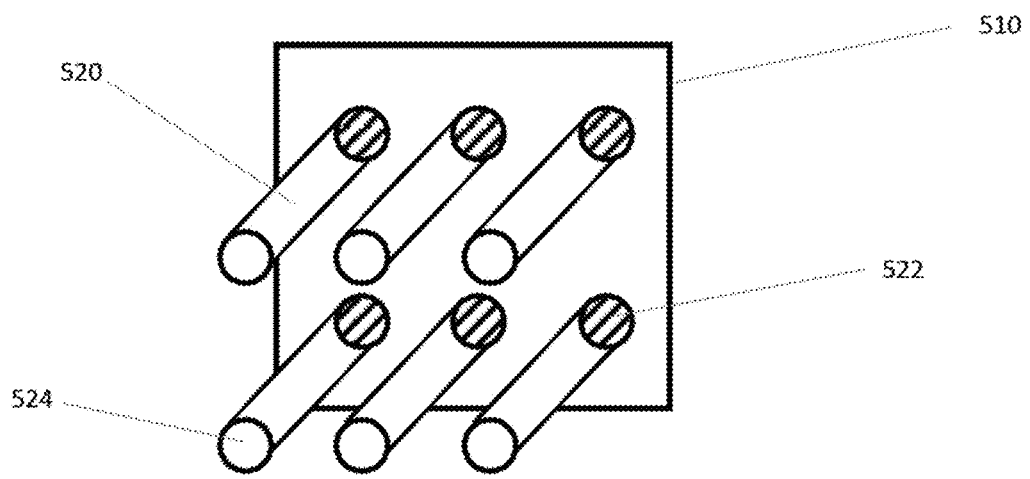
FIGS. 5A, 5B and 5C show a light distribution system in accordance with some embodiments.
Figure 5B:
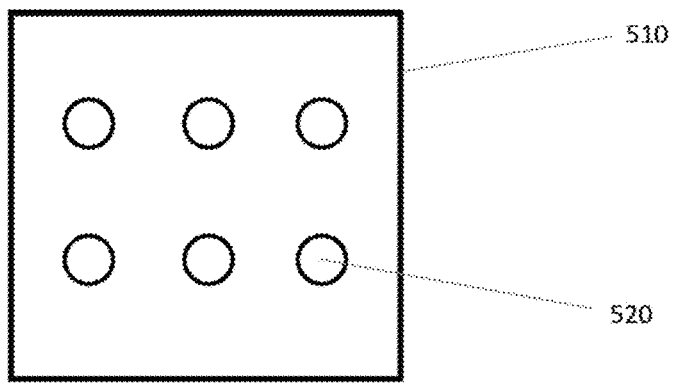
Figure 5C:
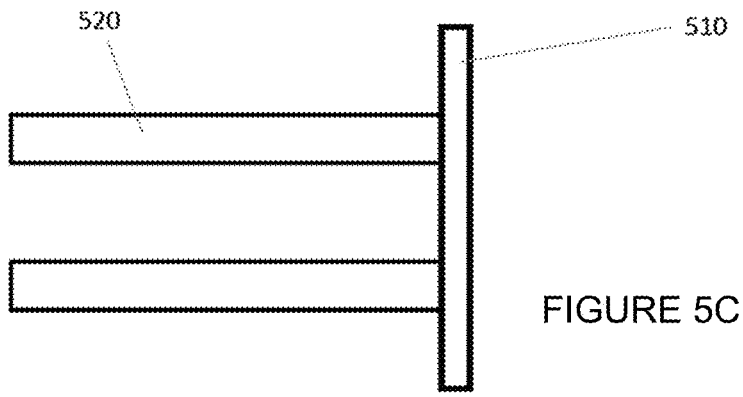

FIG. 5A shows how the optical fibres are optically-coupled to the replay field 510. FIG. 5A shows six optical fibres, such as optical fibre 520, by way of the example only. The input, such as input 522, of each optical fibre is aligned with a respective sub-area of the replay field. The output, such as output 524, of each optical fibre is optically-coupled to the input of at least one illumination sub-system of the vehicle. In some embodiments, each optical fibre is coupled to a respective illumination sub-system such that each optical fibre is uniquely paired to an illumination sub-system. FIG. 5B shows a head-on view of the replay field 510 illustrating the position of the inputs, such as input 520, of the optical fibres. FIG. 5C shows a side view.

Figure 6A:
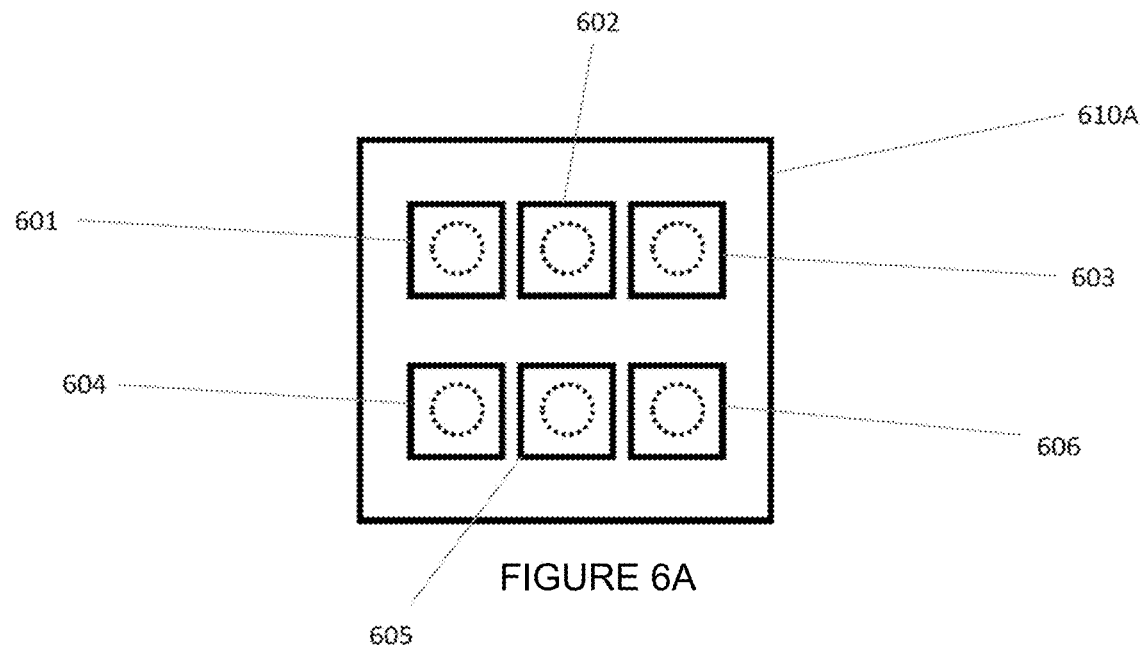
FIGS. 6A, 6B and 6C show a holographic replay field in accordance with some embodiments.
Figure 6B:
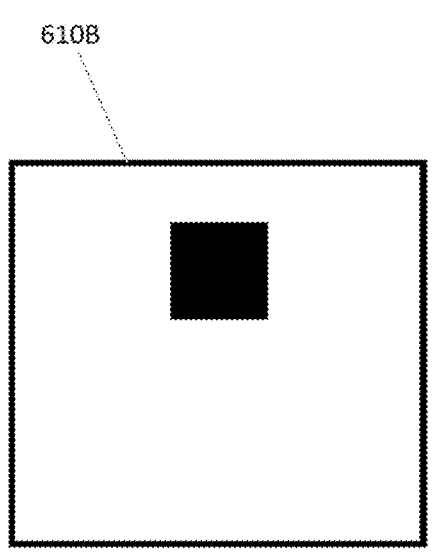
Figure 6C:
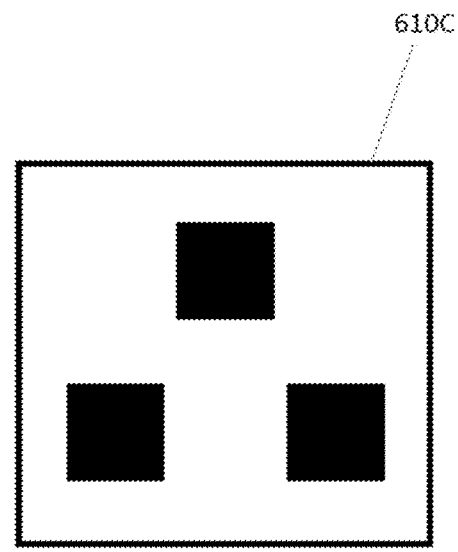

FIG. 6 show how the holographic reconstruction controls which illumination sub-systems receive light. The replay field 610A is divided into six sub-areas 601 to 606. Again, any plurality of sub-areas may be used depending on the number of illumination sub-systems, for example. Each optical fibre is aligned with a respect sub-area of the plurality of sub-areas. The holographic engine 410 receives an input, such as a control signal, from the control system 430. The control signal is used to determine the required hologram. The hologram may be calculated in real-time or retrieved from a repository based on the control signal. The hologram gives rise a particular light pattern in the replay field. FIG. 6B shows a first example in which only sub-area 602 of the replay field receives light. FIG. 6C shows a second example in which sub-areas 602, 604 and 606 receive light. FIG. 6D shows a third example in which different intensities are provided to different illumination sub-systems. In some embodiments, the holographic reconstructions are colour (such as composite colour formed using a SSC or FSC system described below) and different colours are provided to different illumination sub-systems. Accordingly, real-time control of the distribution of light to the various illumination sub-systems of the vehicle is provided.

In some embodiments, a sequence of holograms is displayed on the spatial light modulator, wherein each hologram reconstructs a holographic light field within a common replay field area on the replay plane. The replay field may comprise a plurality of sub-areas, as described above, wherein each sub-area is optically-coupled to an illumination sub-system of the vehicle. In some embodiments, a first hologram is reconstructed to illuminate a first subset of the plurality of sub-areas of the replay field and a second hologram is reconstructed to illuminate a second subset of the plurality of sub-areas of the replay field. The second subset may comprise just one sub-area of the replay field. In some embodiments, the first subset is not the same as the second subset. In some embodiments, the first subset is itself a subset of the second subset, or vice versa. In some embodiments, a first hologram gives rise to illumination of a first sub-area at a first brightness and a second hologram gives rise to illumination of the first sub-area at a second brightness, wherein the first brightness is not equal to the second brightness. In some embodiments, a first holographic reconstruction gives rise to illumination of a first sub-area with light of a first colour and a second holographic reconstruction gives rise to illumination of the first sub-area with light of a second colour, wherein the first colour is not equal to the second colour. Each holographic reconstruction may be in accordance with a FCS or SSC scheme.

In some embodiments, a software-controlled grating function is combined with the hologram and used to further or additionally control the areas of the replay plane which receive light. In some embodiments, each hologram is combined with grating data corresponding to an optical grating having a beam steering function (as described above). The grating data determines the position of the replay field on the replay plane. Accordingly, the position of the light pattern is controllable. In some embodiments, the beam steering function determines the sub-area or sub-areas of the replay plane which receive light. The hologram engine may comprise a look-up table of grating data, wherein each grating data corresponds to at least one illumination sub-system. In some embodiments, the size and shape of the holographic light pattern is fixed and the position of the light pattern within the replay plane is determined by the grating function. The hologram and grating data are combined to form light modulation data. The hologram data and grating data are preferably combined by addition, as described above in the section entitled "hologram calculation".

In some further embodiments, the lighting system in accordance with the present disclosure is additionally or alternatively used to transmit data such as cellular data. In some embodiments, the lighting system is used for Li-Fi. There is therefore provided a communications system for a vehicle and a Light Fidelity, "Li-Fi", system for a vehicle. The system may be considered a distributed antenna system using light. In some embodiments, each illumination sub-system of the vehicle is used distribute the same data. In other embodiments, a selected sub-set of the illumination sub-systems of the vehicle is used to distribute or communication or transmit data such as cellular data. In yet other embodiments, different illumination sub-systems are used to distribute, or transmit, different data. A first illumination sub-system of the vehicle may be used to distribute first data and a second illumination sub-system may be used to distribute, or transmit, second data. The first data may be the same as the second data. The first data may be different to the second data. For example, the first data may be data representing video and the second data may be data representing audio, or vice versa. However, the illumination sub-systems may be used to transmit data of any type. The person skilled in the art of Li-Fi will understand how the light may modulated to carry the data signal. Notably, the system is configured such that each illumination sub-system may provide illumination within the vehicle and data transmission including simultaneous illumination within the vehicle and data transmission. Modulation of the light with a data signal may occur before or after holographic reconstruction has been formed at the replay field. In some embodiments, the modulation occurs before the light is spatially-modulated by the spatial light modulator. In embodiments, light emitted by the central light source of the system is modulated with the data signal. The data transmitted by the illumination sub-system/s may be received by a local Li-Fi enabled device such as a mobile communications device including a mobile or cellular telephone or smartphone, tablet or laptop computer inside or outside the vehicle. In some embodiments, at least one illumination sub-system of the vehicle comprises a receiver arranged to receive corresponding light communications from at least one external device. In these embodiments related to telecommunication using light, the light may be infra-red light.

Additional Features

Embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

In some embodiments, the holographic light source is a laser such as a laser diode. In some embodiments, the light receiving surface is a diffuser surface or screen such as a diffuser. The vehicle may be an automotive vehicle such as a car, truck, van, lorry, motorcycle, train, airplane, boat, or ship.

The quality of the holographic reconstruction may be affect by the so-called zero order problem which is a consequence of the diffractive nature of using a pixelated spatial light modulator. Such zero-order light can be regarded as "noise" and includes for example specularly reflected light, and other unwanted light from the SLM.

In the example of Fourier holography, this "noise" is focussed at the focal point of the Fourier lens leading to a bright spot at the centre of the holographic reconstruction. The zero order light may be simply blocked out however this would mean replacing the bright spot with a dark spot. Some embodiments include an angularly selective filter to remove only the collimated rays of the zero order. Embodiments also include the method of managing the zero-order described in European patent 2,030,072, which is hereby incorporated in its entirety by reference.

In some embodiments, the size (number of pixels in each direction) of the hologram is equal to the size of the spatial light modulator so that the hologram fills the spatial light modulator. That is, the hologram uses all the pixels of the spatial light modulator. In other embodiments, the size of the hologram is less than the size of the spatial light modulator. In some of these other embodiments, part of the hologram (that is, a continuous subset of the pixels of the hologram) is repeated in the unused pixels. This technique may be referred to as "tiling" wherein the surface area of the spatial light modulator is divided up into a number of "tiles", each of which represents at least a subset of the hologram. Each tile is therefore of a smaller size than the spatial light modulator.

In some embodiments, the technique of "tiling" is implemented to increase image quality. Specifically, some embodiments implement the technique of tiling to minimise the size of the image pixels whilst maximising the amount of signal content going into the holographic reconstruction.

In some embodiments, the holographic pattern written to the spatial light modulator comprises at least one whole tile (that is, the complete hologram) and at least one fraction of a tile (that is, a continuous subset of pixels of the hologram).

The holographic reconstruction is created within the zeroth diffraction order of the overall window defined by the spatial light modulator. It is preferred that the first and subsequent orders are displaced far enough so as not to overlap with the image and so that they may be blocked using a spatial filter.

In embodiments, the holographic reconstruction is colour. In examples disclosed herein, three different colour light sources and three corresponding SLMs are used to provide composite colour. These examples may be referred to as spatially-separated colour, "SSC". In a variation encompassed by the present disclosure, the different holograms for each colour are displayed on different area of the same SLM and then combining to form the composite colour image. However, the skilled person will understand that at least some of the devices and methods of the present disclosure are equally applicable to other methods of providing composite colour holographic images.

One of these methods is known as Frame Sequential Colour, "FSC". In an example FSC system, three lasers are used (red, green and blue) and each laser is fired in succession at a single SLM to produce each frame of the video. The colours are cycled (red, green, blue, red, green, blue, etc.) at a fast enough rate such that a human viewer sees a polychromatic image from a combination of the images formed by three lasers. Each hologram is therefore colour specific. For example, in a video at 25 frames per second, the first frame would be produced by firing the red laser for $1/75$th of a second, then the green laser would be fired for $1/75$th of a second, and finally the blue laser would be fired for $1/75$th of a second. The next frame is then produced, starting with the red laser, and so on.

An advantage of FSC method is that the whole SLM is used for each colour. This means that the quality of the three colour images produced will not be compromised because all pixels of the SLM are used for each of the colour images. However, a disadvantage of the FSC method is that the overall image produced will not be as bright as a corresponding image produced by the SSC method by a factor of about 3, because each laser is only used for a third of the time. This drawback could potentially be addressed by overdriving the lasers, or by using more powerful lasers, but this would require more power to be used, would involve higher costs and would make the system less compact.

An advantage of the SSC method is that the image is brighter due to all three lasers being fired at the same time. However, if due to space limitations it is required to use only one SLM, the surface area of the SLM can be divided into three parts, acting in effect as three separate SLMs. The drawback of this is that the quality of each single-colour image is decreased, due to the decrease of SLM surface area available for each monochromatic image. The quality of the polychromatic image is therefore decreased accordingly. The decrease of SLM surface area available means that fewer pixels on the SLM can be used, thus reducing the quality of the image. The quality of the image is reduced because its resolution is reduced. Embodiments utilise the improved SSC technique disclosed in British patent 2,496,108 which is hereby incorporated in its entirety by reference.

Examples describe illuminating the SLM with visible light but the skilled person will understand that the light sources and SLM may equally be used to direct infrared or ultraviolet light, for example, as disclosed herein. For example, the skilled person will be aware of techniques for converting infrared and ultraviolet light into visible light for the purpose of providing the information to a user. For example, the present disclosure extends to using phosphors and/or quantum dot technology for this purpose.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A lighting system for a vehicle, the system comprising:
a holographic projector comprising:
a hologram engine arranged to output holograms;
a spatial light modulator arranged to display each hologram and spatially-modulate light in accordance with each hologram, wherein the spatially-modulated light forms a holographic reconstruction, corresponding to each hologram, on a replay plane; and
a light distribution system comprising a plurality of optical fibres wherein each optical fibre comprises an input optically-coupled to respective sub-area of the replay plane and an output optically coupled with an illumination sub-system of the vehicle, the illumination sub-system being at least one selected from the group consisting of: an internal door handle light; an external door handle light; an electric window switch; a vanity mirror light; a reading light; a foot-well light; a welcome mat light; a door sill light and a wing mirror light.

2. A lighting system as claimed in claim 1 wherein the holographic reconstruction illuminates at least one sub-area of the replay plane optically-coupled to an optical fibre of the plurality of optical fibres.

3. A lighting system as claimed in claim 1 wherein the hologram engine is arranged to output a first hologram at a first time and a second hologram at a second time not equal to the first time, wherein the first hologram forms a first holographic reconstruction which illuminates at least first sub-area of the replay plane optically-coupled to a first optical fibre of the plurality of optical fibres and the second hologram forms a second holographic reconstruction which illuminates at least a second sub-area of the replay plane optically-coupled to a second optical fibre of the plurality of optical fibres.

4. A lighting system as claimed in claim 3 wherein the first hologram and second hologram are such that the brightness of the light illuminating the first sub-area is not equal to the brightness of the light illuminating the second sub-area.

5. A lighting system as claimed in claim 3 wherein the colour of the light illuminating the first sub-area is not equal to the colour of the light illuminating the second sub-area.

6. A lighting system as claimed in claim 1 wherein the hologram engine is further arranged to combine each hologram with a grating function corresponding to an optical grating having a grating period.

7. A lighting system as claimed in claim 6 wherein the grating period determines the sub-area or sub-areas of the replay plane illuminated by the holographic reconstruction.

8. A lighting system as claimed in claim 6 wherein the hologram engine comprises a look-up table of grating functions, wherein each grating function corresponds to at least one illumination sub-system of the vehicle.

9. A lighting system as claimed in claim 1 wherein each optical fibre is a multimode optical fibre.

10. A lighting system as claimed in claim 1 wherein the hologram is a Fourier transform hologram or a Fresnel transform hologram.

11. A lighting system as claimed in claim 1 wherein the holographic projector further comprises a light-receiving surface, at the replay plane, arranged to receive the holographic reconstruction.

12. A lighting system as claimed in claim 1 wherein the spatial light modulator is a phase modulator and wherein the hologram comprises an array of phase-delay values.

13. A lighting system as claimed in claim 1 wherein the hologram engine is arranged to: receive image data and calculate the hologram real-time from the image data; or receive a control signal and determine the hologram, from a plurality of holograms stored in memory, in response to the control signal.

14. A lighting system as claimed in claim 1 wherein the light distribution system is a Li-Fi system in which at least one illumination sub-system of the vehicle is a Li-Fi antenna of the Li-Fi system.

15. A lighting system as claimed in claim 1 wherein the spatially-modulated light is modulated or encoded with telecommunications data.

16. A lighting system as claimed in claim 15 wherein a first illumination sub-system of the vehicle is arranged to transmit first telecommunications data and a second illumination sub-system of the vehicle is arranged to transmit second telecommunications data, optionally, wherein the first telecommunications data is different to the second telecommunications data.

17. A vehicle comprising the lighting system of claim 1.

18. A method of providing light to an illumination sub-system of a vehicle, the method comprising:
providing a hologram to a spatial light modulator;
displaying the hologram on the spatial light modulator;
spatially modulating light in accordance with the hologram to form a holographic reconstruction, corresponding to the hologram, on a replay plane;
providing light of the holographic reconstruction to an illumination sub-system of the vehicle using an optical fibre having an input optically-coupled to a sub-area of the replay plane illuminated by the holographic reconstruction and an output optically-coupled to the illumination sub-system, wherein the illumination sub-system is at least one selected from the group consisting of: an internal door handle light; an external door handle light; an electric window switch; a vanity mirror light; a reading light; a foot-well light; a welcome mat light; a door sill light and a wing mirror light.

19. A method of providing light as claimed in claim 18, the method further comprising:
providing a second hologram to the spatial light modulator;
displaying the second hologram on the spatial light modulator;
spatially modulating light in accordance with the second hologram to form a second holographic reconstruction, corresponding to the second hologram, on a replay plane;
providing light of the second holographic reconstruction to a second illumination sub-system of the vehicle using a second optical fibre having an input optically-coupled to a second sub-area of the replay plane illuminated by the second holographic reconstruction and an output optically-coupled to the second illumination sub-system,
wherein the first hologram is provided to the spatial light modulator at a first time, and the second hologram is provided to the spatial light modulator at a second time not equal to the first time.

20. A lighting system as claimed in claim 19 wherein the hologram and the second hologram are such that the brightness of the light illuminating the first sub-area is not equal to the brightness of the light illuminating the second sub-area, and/or the colour of the light illuminating the first sub-area is not equal to the colour of the light illuminating the second sub-area.

21. A method as claimed in claim 18, wherein the holographic reconstruction illuminates at least one sub-area of the replay plane optically-coupled to the optical fibre.

22. A method as claimed in claim 18 wherein the hologram engine combines the hologram with a grating function corresponding to an optical grating having a grating period, wherein the grating period determines the sub-area or sub-areas of the replay plane illuminated by the holographic reconstruction.

23. A method as claimed in claim 22 wherein the hologram engine comprises a look-up table of grating functions, wherein each grating function corresponds to at least one illumination sub-system of the vehicle.

* * * * *